(12) United States Patent
Li et al.

(10) Patent No.: US 7,660,204 B2
(45) Date of Patent: Feb. 9, 2010

(54) DATA ACQUISITION METHOD OF NON-REAL TIME TRANSMITTING SEISMIC DATA ACQUISITION SYSTEM APPLIED IN MOUNTAINOUS AREA

(75) Inventors: Qingzhong Li, Zhuozhou (CN); Lianqing Chen, Zhuozhou (CN); Weibing Luo, Zhuozhou (CN); Bijin Yi, Zhuozhou (CN); Xiaochun Dang, Zhuozhou (CN); Xiangrui Xia, Zhuozhou (CN); Fulong Luo, Zhuozhou (CN)

(73) Assignee: BGP Inc., China National Petroleum Corporation, Zhuozhou, Hebei Province (CN)

( * ) Notice: Subject to any disclaimer, the term of this patent is extended or adjusted under 35 U.S.C. 154(b) by 355 days.

(21) Appl. No.: 10/589,647
(22) PCT Filed: Aug. 24, 2004
(86) PCT No.: PCT/CN2004/000978
§ 371 (c)(1), (2), (4) Date: Aug. 16, 2006
(87) PCT Pub. No.: WO2005/085906
PCT Pub. Date: Sep. 15, 2005

(65) Prior Publication Data
US 2007/0177460 A1   Aug. 2, 2007

(30) Foreign Application Priority Data
Mar. 8, 2004  (CN) .................. 2004 1 0006466

(51) Int. Cl.
*G01V 1/00* (2006.01)

(52) U.S. Cl. .......................... 367/77; 367/38
(58) Field of Classification Search ............ 367/38, 367/56, 76–79
See application file for complete search history.

(56) References Cited

U.S. PATENT DOCUMENTS 3,806,864 A * 4/1974 Broding et al. .......... 367/77
3,825,899 A * 7/1974 Haeberle et al. ......... 370/324

(Continued)

FOREIGN PATENT DOCUMENTS

| CN | 1325493 | 12/2001 |
| WO | 00/26694 | 5/2000 |

*Primary Examiner*—Scott A Hughes
(74) *Attorney, Agent, or Firm*—Ladas & Parry LLP

(57) ABSTRACT

A data acquisition method of a non-real time transmitting seismic data acquisition system applied in mountainous areas. The format of original record file names is an 8 digit file name representing absolute time together with 3 digit extension names representing the equipment's serial number. The detonating units generate SPS format spreadsheets according to the above file name generation method. SPS format spreadsheets of several detonating units are combined on the basis of the SPS format spreadsheets generated by every detonating unit and then put in a data retrieval unit. The effective file names, which are recorded in the SPS format spreadsheets while detonating units are operating, are based on the former 8 digits. The acquisition unit and the data retrieval unit are connected by network lines, and a data retrieving program will run by the data retrieval unit. This method is exclusive and feasible to manage and search the seismic data. The method solves the technically difficult problems of data management for original record files and the difficulties of retrieving data as result of non-real time transmitting characteristics of the system.

4 Claims, 4 Drawing Sheets

U.S. PATENT DOCUMENTS

| | | | |
|---|---|---|---|
| 4,086,504 A * | 4/1978 | Ezell et al. | 367/77 |
| 4,281,403 A * | 7/1981 | Siems et al. | 367/76 |
| 4,604,699 A * | 8/1986 | Borcherdt et al. | 702/15 |
| 4,674,068 A * | 6/1987 | Carruth, Jr. | 367/77 |
| 4,725,992 A * | 2/1988 | McNatt et al. | 367/77 |
| 4,885,724 A * | 12/1989 | Read et al. | 367/77 |
| 5,173,880 A | 12/1992 | Duren et al. | |
| 5,253,219 A | 10/1993 | Houston et al. | |
| 5,724,241 A * | 3/1998 | Wood et al. | 702/14 |
| 5,937,362 A * | 8/1999 | Lindsay et al. | 702/9 |
| 6,330,513 B1 | 12/2001 | Matthews | |
| 6,347,374 B1 * | 2/2002 | Drake et al. | 726/1 |
| 6,977,867 B2 * | 12/2005 | Chamberlain | 367/76 |
| 7,286,442 B2 * | 10/2007 | Ray et al. | 367/15 |

* cited by examiner

DATA ACQUISITION METHOD OF NON-REAL TIME TRANSMITTING SEISMIC DATA ACQUISITION SYSTEM APPLIED IN MOUNTAINOUS AREA

BACKGROUND OF THE INVENTION

1. Field of the Invention

This invention relates to the fields of petroleum seismic exploration, geology, acquisition of seismic data for coal mine resources, and earthquake detection.

2. Related Art

Following the development of the technology of geophysical exploration, seismic prospecting is directed towards higher mountainous regions in which it is more difficult to work and all remote transmission seismic apparatuses of real time transmission by cable/wireless have had more and more difficulty meeting the requirements of practical prospecting.

For example, remote transmission seismic apparatuses using cables entail carrying large bundles of cables to mountain cliffs. This results in the use of a great amount of labor and transporting equipment, is very dangerous, and frequently results in casualties and damage to the equipment. In addition, it is frequently impossible to deploy cables to a designed position as a result of the limitation in length of the cables, so that channels may be emptied or lost.

Although a remote transmission seismic apparatus using wireless transmission is convenient, the system usually loses channels and/or stations in mountainous regions as a result of the blind regions of radio transmission. The workload is increased because the great amount of electric energy consumed by wireless transmission needs heavy power supply equipment. The efficiency of the deployment of wireless remote transmission seismic apparatuses decreases along with the increase of channels deployed because more time is needed for the real time data return transmission. The aforementioned two kinds of seismic apparatuses have had very much difficulty meeting the needs of the field when the work is in mountainous areas with very bad topography.

The applicants have invented remote transmission seismic apparatuses using GPS (Global Positioning System) satellite timing, which has "no central units (main seismometer), no cables, and no radio stations, and is portable, cheap, and intelligent" (the application numbers of those Chinese patents are CN01134726.0 and CN02129603.0) for compensating for the shortage of real time transmitting seismic apparatuses in the fields of system conveying, arrangement of cables for prospecting, data transmission, and communication. The remote transmission seismic apparatuses using GPS satellite timing are especially suitable to seismic prospecting work in complicated because the apparatus has two manners of working, timing data acquisition and continuous data acquisition, so that the working efficiency of seismic data acquisition in those fields is increased and the cost is decreased.

The non-real time transmission seismic data acquisition apparatus uses high accuracy GPS clock signals to synchronize the system clocks of every acquisition unit and remote detonating unit, and works by way of timed and synchronized detonating and recording. In operation, the detonating and recording units all operate according to a flow chart designed for the system without any artificially intervention. If the system operates 12 hours every day and acquires and records data for every minute, the numbers of original record files in every data acquisition unit every day are equal to 12×60, i.e., 720 original record files every day. If the system operates 12 hours every day and acquires and records data for every ten seconds, the numbers of original record files in every data acquisition unit every day are equal to 12×60×6, i.e., 4320 original record files every day. The number of original files in the data acquisition units increase as the number of data acquisition units and the data acquisition time increase (i.e., increase by degrees of geometric series). Therefore, whether or not the present system is capable of being applied in practice, the key points are how to manage and safely retrieve these original record files.

SUMMARY OF THE INVENTION

The data acquisition method of a non-real time transmitting seismic data acquisition system applied in mountainous areas of this invention may solve the following technical problems in a non-real time transmitting seismic data acquisition system, and can safely and effectively manage tens of thousands original record files, intelligently retrieve record files in the acquisition unit, and permute the data after retrieving it.

The data acquisition method of a non-real time transmitting seismic data acquisition system applied in mountainous areas of this invention has the following features:

(1) using the eight digit file names representing absolute time together with three digit extension names representing equipment serial names as the format of original record file names, wherein the eight digit file names and three digit extension names consist of Arabic numerals 0-9 and English letters;

(2) all original record files names in the data acquisition unit are 8+3 digit file names and consist of Arabic numerals 0-9 and English letters; the former eight digits represent years, months, days, hours, minutes, and seconds; and the latter three extension name digits represent the equipment's serial number of data acquisition units;

(3) the detonating units generate SPS format (Shell's Processing Support Format) spreadsheets of 3-D land seismic exploration assistant data according to file names generating the method of step (1), and at the same time, it is appointed that by means of distinguishing intermittence signals generated by the high voltage circuits in the detonating units, the operating systems in the detonating units write the effective explosion's absolute operating time into SPS format spreadsheets of 3-D land seismic exploration assistant data according to the detonating unit's file names generating method when there are intermittence signals, and does not record the absolute operating time in SPS format spreadsheets of 3-D land seismic exploration assistant data when there are no intermittence signals;

(4) combining the multiple detonating unit's SPS format spreadsheets of 3-D land seismic exploration assistant data according to SPS format spreadsheets of 3-D land seismic exploration assistant data, which are generated by the multiple detonating units to prepare for retrieving the data; while retrieving, inputting the combined multiple detonating unit's SPS format spreadsheets of 3-D land seismic exploration assistant data into the data retrieve units, which consist of microprocessors with system bus.

The above file names are effectively recorded in SPS format spreadsheets of 3-D land seismic exploration assistant data on the basis of the former eight digits; connecting the data acquisition units and the data retrieval units by network lines; operating the data retrieving programs in the data retrieval units; connecting the data retrieval units and the data acquisition units with a special line; and running the data retrieving programs to complete the following operations:

a) searching the original files effectively recorded in the field acquisition units and copying them into the data retrieval units;

b) setting the original files as read-only attributes on the disks of computers in the field acquisition units to prevent loss of data, so that the data can be retrieved again; and c) deleting the great amount of unnecessary data to release disk space to prepare for the next acquisition;

(5) arranging the data sequences indoors after the data retrieving operations; rearranging the original data files effectively recorded in the multiple data retrieval units into the format recorded in the unit of shots according to "the regulations of the same file names" on the basis of the layout to provide to the system of processing data.

In the data acquisition method of a non-real time transmitting seismic data acquisition system applied in mountainous areas, when the generation of original file names recorded in the data acquisition units are recorded once for every minute, the former eight digits have the following meaning: the first digit of the former eight digits represents years and consists of Arabic numerals and English letters, and is circularly used again and again for 36 years; the second digit represents months and consists of Arabic numerals, and is denoted according to the practical calendar; the fifth and the sixth digits represent hours and consist of Arabic numerals, and is denoted according to the 24 hour system; and the seventh and the eighth digits represent minutes and consist of Arabic numerals, and is denoted according to the 60 minute system.

In the data acquisition method of a non-real time transmitting seismic data acquisition system applied in mountainous areas, when the generation of original file names recorded in the data acquisition units are recorded once for every ten-seconds, the former eight digits have the following meaning: the first digit of the former eight digits represents years and consists of English letters, and is circularly used again and again for 26 years; the second digit represents months and consists of Arabic numerals and English letters; the third digit represents days and consists of Arabic numerals and English letters, and is denoted according to the practical calendar; the fourth and the fifth digits represent hours and consist of Arabic numerals, and is denoted according to the 24 hour system; the sixth and the seventh digits represent minutes and consist of Arabic numerals, and is denoted according to the 60 minute system; and the eighth digit represents seconds; and every ten seconds is used as a measure unit.

In the data acquisition method of a non-time transmitting seismic data acquisition system applied in mountainous areas, wherein the extension names of the detonating units are ._XX, which denote the serial number of the detonating units, and the latter two digits after the underscore consist of Arabic numerals 0-9 and English letters, which are permuted and combined.

This invention has the following advantages and positive effects in comparison with the traditional seismic data acquisition methods.

It is realized to manage the original file data recorded in the data acquisition units effectively and safely by means of the original record file data acquisition method of a non-real time transmitting seismic data acquisition apparatus. The method is exclusive and feasible to manage and search and has solved the technically difficult problems of the data management for original record files and the difficulties of retrieving data as result of non-real time transmitting characteristics of the system. The method may find the original file data (effective data) recorded in the every field data acquisition unit quickly and accurately and delete the unnecessary data acquired. The method realizes the safe and intelligent management of the original record file data of a non-real time transmitting seismic data acquisition apparatus to provide a safe and reliable managing mechanism for permuting and arranging the data at the latter time.

The present invention may be made intelligent without any artificial intervention if otherwise equipped with special software and equipment for automatically permuting the data indoors so that this invention can also completes the whole process of seismic data acquisition in the field completed by the conventional real time data acquisition system.

DETAILED DESCRIPTION OF THE PREFERRED EMBODIMENTS

Figure 1:
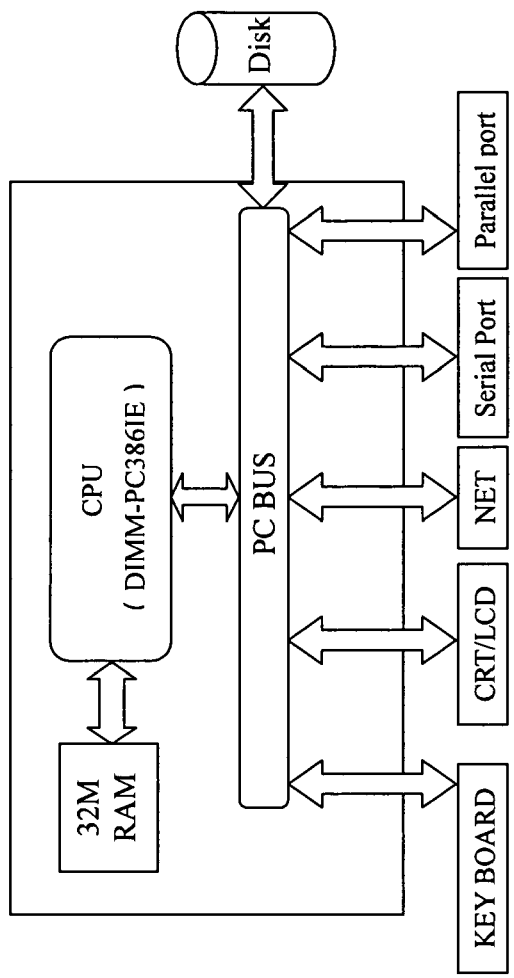
FIG. 1 is a block diagram of the circuits of the data retrieval unit according to the invention.
Figure 2:
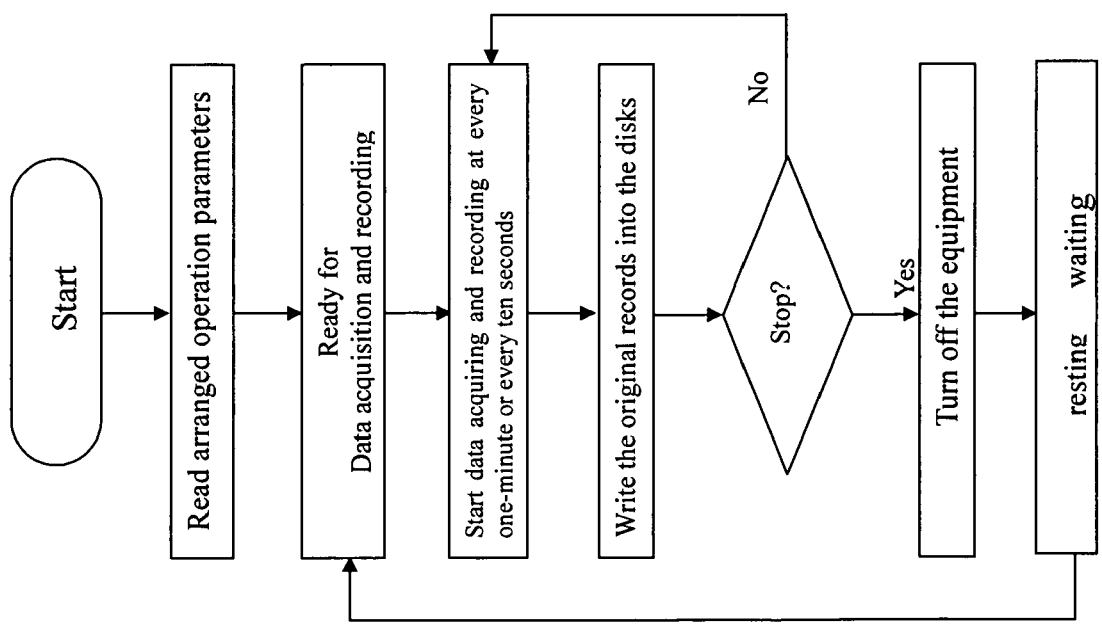
FIG. 2 is a flow chart of the operation of the data acquisition units according to the invention.
Figure 3:
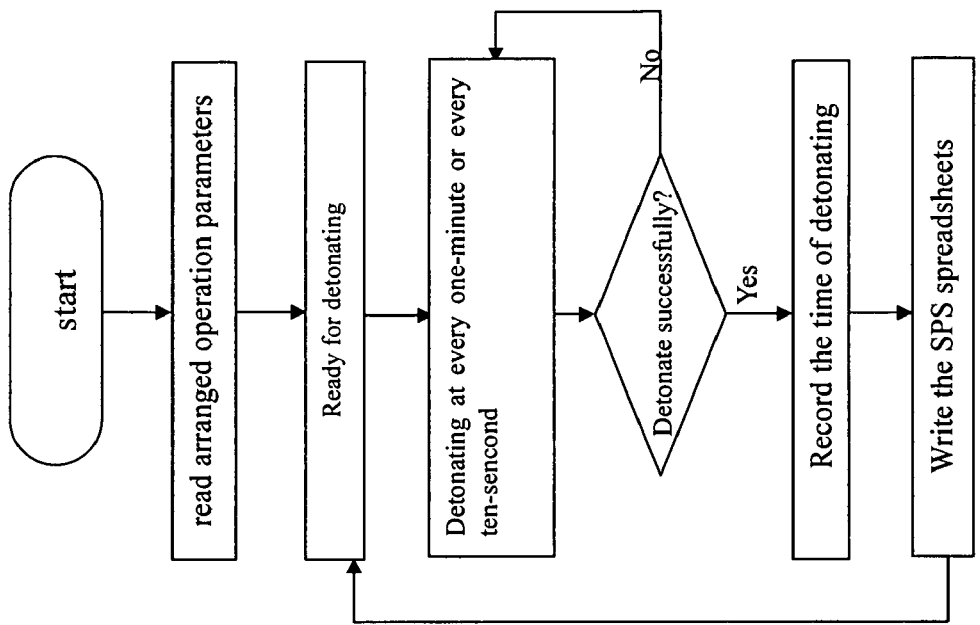
FIG. 3 is a flow chart of the operation of the detonating units according to the invention.
Figure 4:
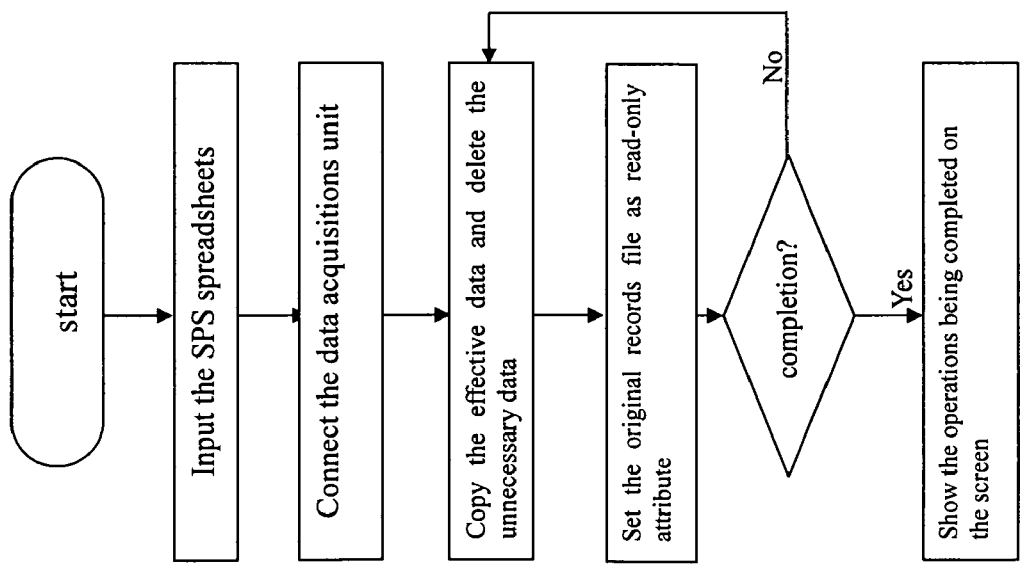
FIG. 4 is a flow chart of the operation of the data retrieval units according to the invention.
Figure 5:
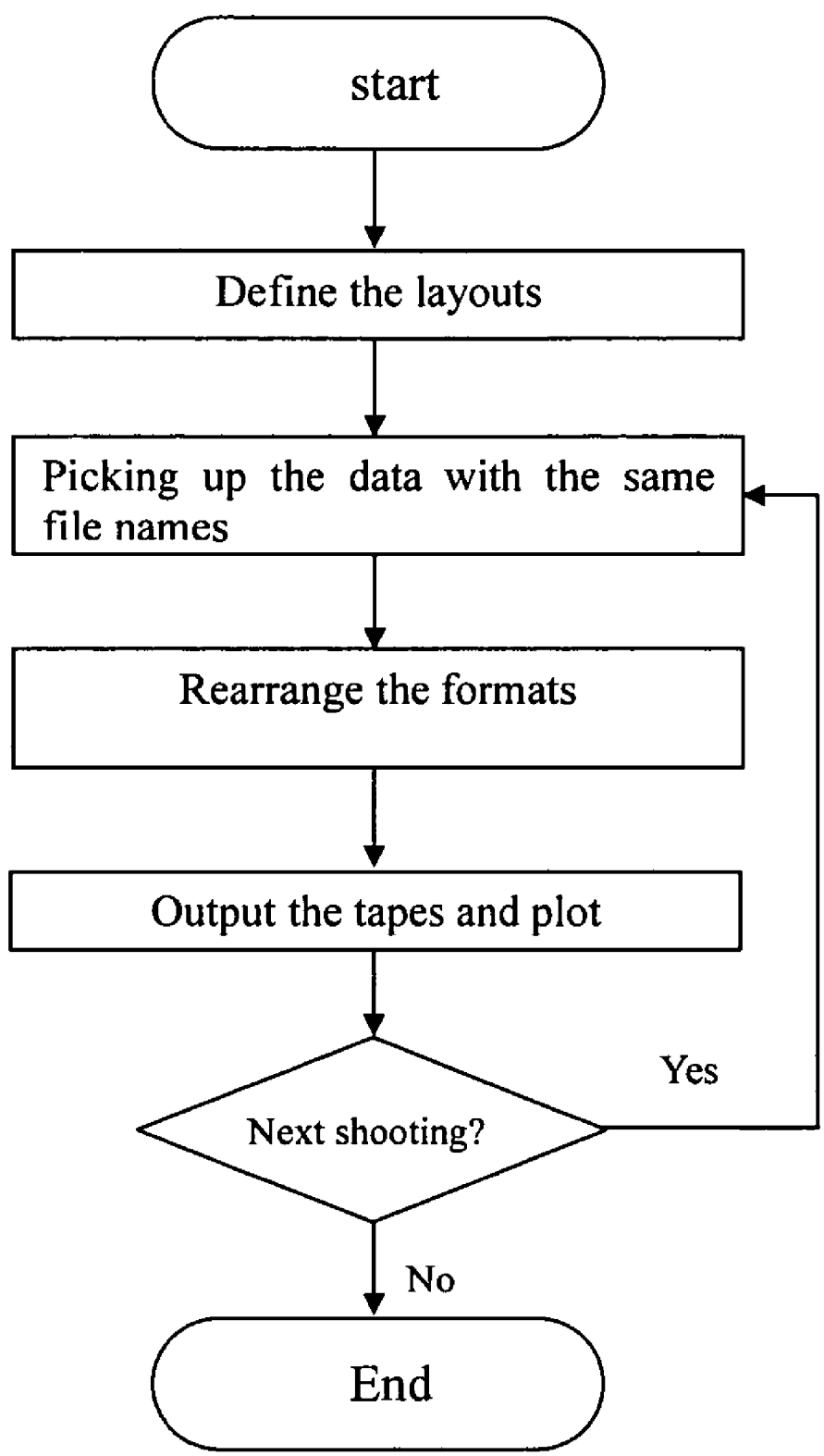
FIG. 5 is a flow chart of the operation of permuting the data indoors according to the invention.
Figure 6:
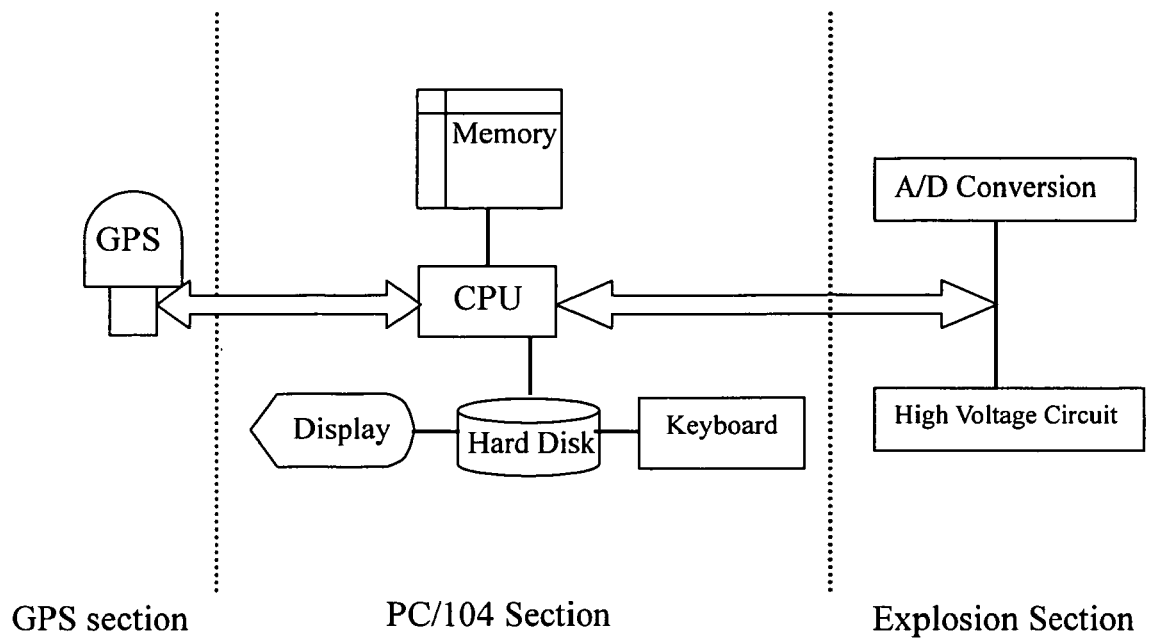
FIG. 6 is a block diagram of the structure of the detonating unit system according to the invention.
Figure 7:
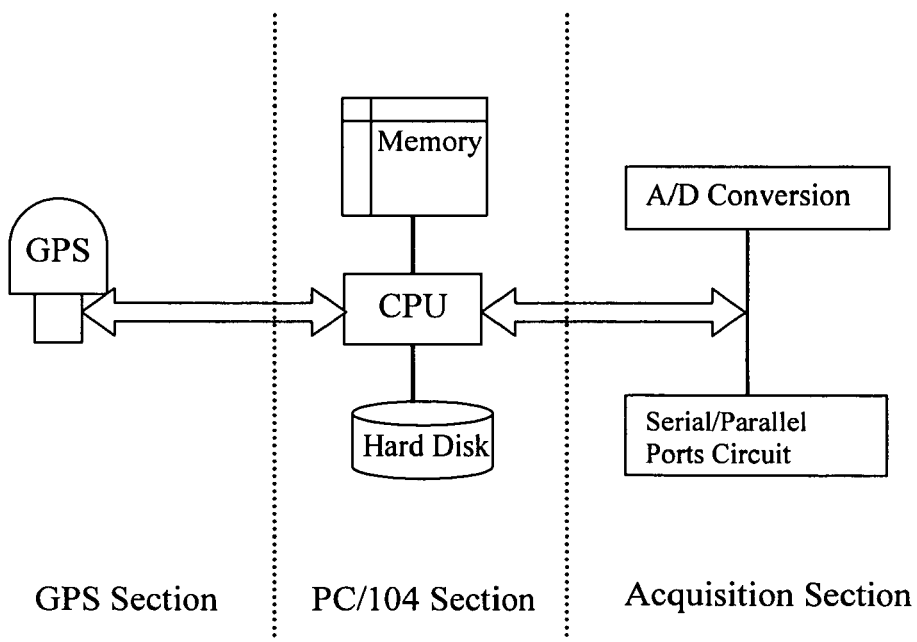
FIG. 7 is a block diagram of the structure of the data acquisition unit system according to the invention.

The modes and steps of embodying the invention in detail are as follows:

1. The format of the file names of the original record files are eight digit file names together with three digit extension names which consist of Arabic numerals 0-9 and English letters, i.e., XXXXXXXX.XXX.

The former eight file name digits represent absolute time.

The latter three extension name digits represent the serial number of the equipment.

2. The regulations of generating file names of the data acquisition units.

The meanings of eight digits together with three digit file names.

(A) The meaning of XXXXXXXX while recording once for every minute:

The first digit represents years and consists of Arabic numerals and English letters, and is circularly used again and again for 36 years. It is appointed that the number 0 represents the year 2000, the number 1 represents the year 2001, the number 9 represents the year 2009, the letter a represents the year 2010, the letter b represents the year 2011, . . . , and so on.

The second digit represents months and consists of Arabic numerals and English letters. It is appointed that the number 1 represents January, the number 9 represents September, the letter a represents October, the letter b represents November, and the letter c represents December.

The third and fourth digits represent date and consist of Arabic numerals, and are denoted according to the practical calendar. It is appointed that the numbers 01 represent the first day in the calendar, and the numbers 31 represent the thirty-first day in the calendar.

The fifth and sixth digits represent hours and consist of Arabic numerals, and are denoted according to the 24 hour system. It is appointed that the numbers 00 represent 0 o'clock midnight, the numbers 01 represent 1 o'clock a.m., . . . , and the numbers 23 represent 23 o'clock p.m.

The seventh and eighth digits represent minutes and consist of Arabic numerals, and are denoted according to the 60 minute system. It is appointed that the numbers 00 represent zero minutes, the numbers 01 represent one minute, . . . , and the numbers 59 represent fifty-nine minutes.

Hence, for example, 3a231834.XXX represents the seismic records received (or the existent shooting) at eighteen thirty-four p.m. sharp on Oct. 23, 2003.

(B) The meaning of XXXXXXXX while recording once for every ten-seconds:

The first digit represents years and consists of English letters, and is circularly used again and again for 26 years. It is appointed that the letter a represents the year 2001, the letter b represents the year 2002, the letter c represents the year 2003 £ . . . £ and so on; the rest may be deduced by analogy.

The second digit represents months and consists of Arabic numerals and English letters. It is appointed that the number 1 represents January, the number 9 represents September, the letter a represents October, the letter b represents November, and the letter c represents December.

The third digit represents days and consists of Arabic numerals, and is denoted according to the practical calendar. It is appointed that the number 1 represents the first day in the calendar, . . . , the number 9 represents the ninth day in the calendar, the letter a represents the tenth day in the calendar, the letter b represents the eleventh day in the calendar, . . . , and the letter v represents the thirty-first day in the calendar.

The fourth and fifth digits represent hours and consist of Arabic numerals, and are denoted according to the 24 hour system. It is appointed that the numbers 00 represent 0 o'clock midnight, the numbers 01 represent 1 o'clock a.m., and the numbers 23 represent 23 o'clock p.m.

The sixth and seventh digits represent minutes and consist of Arabic numerals, and are denoted according to the 60 minute system. It is appointed that the numbers 00 represent zero minutes, the numbers 01 represent one minute, . . . , and the numbers 59 represent fifty-nine minutes.

The eighth digit represents seconds. Every ten-second unit is used as a measure unit. It is appointed that the number 0 represents 00 second, the number 1 represents 10 seconds, . . . , and the number 5 represents 50 seconds.

Hence, for example, cau18343.XXX represents the seismic records received (or the existent shooting) at eighteen thirty-four and thirty seconds p.m. sharp on Oct. 30, 2003.

The above two methods of managing files are distinguished by the first digit representing the years before 2009, the former consists of Arabic numerals, and the latter starts with English letters; for the years after 2009, the difference between them is nine years so that there can be no confusion with each other. Therefore, the file name is still "exclusive".

3. The meaning of three extension names (1) The three extension names of the data acquisitions units. XXX represent the equipment's serial number of the data acquisition units and consist of the permutation and combination of the Arabic numerals 0-9 and English letters. It is denoted that the first equipment is numbered as 001, 999 represents the product serial number of the 999th equipment, 00a represents the product serial number of the first thousandth equipment, . . . , and so on; the rest may be deduced by analogy.

This nomenclature may generate $36^3=46656$ names of the equipment. These names are enough to manage 139968 seismic traces.

(2) The extension names of the detonating units are .\_XX, denote the detonating unit's serial number, and consist of one underscore and two characters. The two digits XX consist of the permutation and combination of the Arabic numerals 0-9 and English letters 4. The generation method of the operation files of the detonating units The detonating unit consists of GPS receiving sections, industrial microcomputers, high voltage circuits, and A/D conversion circuits. The output of the high voltage circuits is connected to detonating ends of electric detonators. The operating systems in the detonating units operate by means of distinguishing intermittence signals generated by the high voltage circuits in the detonating units. When there are intermittence signals, the detonating units write the effective explosion's absolute operation time into SPS format spreadsheets of 3-D land seismic exploration assistant data according to the methods of generating file names of the detonating units; and when there are no intermittence signals, the detonating units do not record the absolute operation time into SPS format spreadsheets of three dimensions seismic exploration assistant data. The SPS format spreadsheets of 3-D land seismic exploration assistant data are generated according to the generation methods of file names of the detonating units when the detonating units are operating, and at the same time, it is appointed that the effective explosion's absolute operation time is written into the SPS format spreadsheets of 3-D land seismic exploration assistant data according to the generation methods of file names of the detonating units only when the detonating units detonate the explosive successfully, and when the operations are off and the detonation of the explosive is not successful, the absolute operation time is not recorded into the SPS format spreadsheets of 3-D land seismic exploration assistant data.

5. The intelligent retrieving of the data

The intelligent retrieving of data is an application on the basis of the original record file data acquisition methods of a non-time transmitting seismic data acquisition apparatus. First of all, the SPS format spreadsheets of 3-D land seismic exploration assistant data of multiple detonating units are combined according to the SPS format spreadsheets of 3-D land seismic exploration assistant data generated by the detonating units so as to prepare for retrieving the data.

When retrieving, the combined SPS format spreadsheets of 3-D land seismic exploration assistant data of the detonating units are put into the special data retrieve units. The data acquisition units and the special data retrieve units are connected by net lines in the form of a network according to the file names (the former eight digits) effectively recorded in the SPS format spreadsheets of 3-D land seismic exploration assistant data while the detonating units are operating. The programs of intelligent data retrieval are run in the special data retrieve units. The field operators only connect the plugs of the special data retrieve units to the special plugs of the data acquisition units and initiate an intelligent retrieve program system so that the following operations are completed automatically:

1. According to the principles of "the same file names", the original effective file data recorded in the data acquisition units are searched and copied to the data retrieve units.

2. The original effective file records are set as read-only attributes on the computer disks of the data acquisition units to prevent loss of the data; if the data would be lost, the data can also be retrieved.
3. The great amounts of unnecessary data acquired are deleted to release disk space to prepare for the next recording.

The above data acquisition units consist of GPS receiving sections, industrial microcomputers, and A/D conversion circuits.

The invention claimed is:

1. A data acquisition method of non-real time transmitting in a seismic data acquisition system applied in a mountainous region, comprising the steps of:
   using eight digit file names representing an absolute time together with three digit extension names representing equipment serial names as a format of original record file names, wherein the eight digit file names and three digit extension names consist of Arabic numerals 0-9 and English letters, and
   wherein all original record filenames in a data acquisition unit are 8+3 digit file names and consist of Arabic numerals 0-9 and English letters, the former eight digits representing years, months, days, hours, minutes, and seconds, and the latter three extension digits representing the equipment serial names of the data acquisition units;
   generating, by detonating units, SPS (Shell's Processing Support) format spreadsheets of 3-D land seismic exploration assistant data according to the file names generating method of the using step, and, at the same time, distinguishing intermittence signals generated by high voltage circuits in the detonating units, and writing, by operating systems in the detonating units, the absolute operating time of an effective explosion into SPS format spreadsheets of 3-D land seismic exploration assistant data according to the file names generating method of the detonating unit when there are intermittence signals, and not recording any absolute operating time in SPS format spreadsheets of 3-D land seismic exploration assistant data when there are no intermittence signals;
   combining SPS format spreadsheets of 3-D land seismic exploration assistant data from the multiple detonating units according to SPS format spreadsheets of 3-D land seismic exploration assistant data, which are generated by the multiple detonating units to prepare for retrieving the data; and, while retrieving, inputting the combined SPS format spreadsheets of 3-D land seismic exploration assistant data from the multiple detonating units into data retrieval units, which consist of microprocessors having a system bus;
   recording the file names in SPS format spreadsheets of 3-D land seismic exploration assistant data using the former eight digit file names; connecting the data acquisition units and the data retrieval units by network lines; operating the data retrieval programs in the data retrieval units; connecting special plugs of the data retrieval units to special plugs of the data acquisition units; and initiating the data retrieval programs to command the systems to complete the following operations:

a) searching the original file data effectively recorded in the data acquisition units and copying the original file data effectively recorded in the data acquisition units into the data retrieval units;
   b) setting the original file data effectively recorded as read-only attributes on the computer disks in the data acquisition units to prevent loss of the data, and, in that case, the data can be retrieved;
   c) deleting unnecessary data acquired to free disk space so as to prepare for the next recording; and
   arranging the data sequences indoors after the data retrieving operations; rearranging the original file data effectively recorded in the multiple data retrieval units into the format recorded in the unit of shots according to the format of original record names on the basis of the layout to provide to the system of processing data.

2. The data acquisition method of non-real time transmitting in a seismic data acquisition system applied in mountainous regions according to claim 1, wherein when the original file names generated and recorded in the data acquisition units are recorded once for every minute, the former eight digits have the following meaning: the first digit of the former eight digits represents years and consists of Arabic numerals and English letters, and is circularly used repeatedly for 36 years; the second digit represents months and consists of Arabic numerals, and is denoted according to the practical calendar; the fifth and the sixth digits represent hours and consist of Arabic numerals, and are denoted according to a 24 hour system; and the seventh and the eighth digits represent minutes and consist of Arabic numerals, and are denoted according to a 60 minute system.

3. The data acquisition method of non-real time transmitting in a seismic data acquisition system applied in mountainous areas according to claim 1, wherein when the original file names generated and recorded in the data acquisition units are recorded once for every ten seconds, the former eight digits have the following meaning: the first digit of the former eight digits represents years and consists of English letters, and is circularly used repeatedly for 26 years; the second digit represents months and consists of Arabic numerals and English letters; the third digit represents days and consists of Arabic numerals and English letters, and is denoted according to the practical calendar; the fourth and the fifth digits represent hours and consist of Arabic numerals, and are denoted according to a 24 hour system; the sixth and the seventh digits represent minutes and consist of Arabic numerals, and are denoted according to a 60 minute system; and the eighth digit represents seconds; and every ten-second unit is used as a measure unit.

4. The data acquisition method of non-real time transmitting in a seismic data acquisition system applied in mountainous areas according to claim 1, wherein the extension names of the detonating units are ._XX, which denote the serial number of the detonating units, and the latter two digits after the underscore consist of Arabic numerals 0-9 and English letters, which are permuted and combined.

* * * * *